US012469245B2

(12) United States Patent
Takkar et al.

(10) Patent No.: US 12,469,245 B2
(45) Date of Patent: Nov. 11, 2025

(54) SYSTEMS AND METHODS FOR PERFORMING COMPUTER VISION TASK USING A SEQUENCE OF FRAMES

(71) Applicants: Manpreet Singh Takkar, Brampton (CA); Zixuan Hu, Markham (CA); Wei Zhou, Richmond Hill (CA)

(72) Inventors: Manpreet Singh Takkar, Brampton (CA); Zixuan Hu, Markham (CA); Wei Zhou, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 17/507,489

(22) Filed: Oct. 21, 2021

(65) Prior Publication Data

US 2023/0033548 A1 Feb. 2, 2023

Related U.S. Application Data

(60) Provisional application No. 63/225,787, filed on Jul. 26, 2021.

(51) Int. Cl.
*G06V 10/22* (2022.01)
*G06V 10/10* (2022.01)

(52) U.S. Cl.
CPC .............. *G06V 10/22* (2022.01); *G06V 10/16* (2022.01)

(58) Field of Classification Search
None
See application file for complete search history.

(56) References Cited

U.S. PATENT DOCUMENTS

| 2017/0286774 A1* | 10/2017 | Gaidon | G06T 7/248 |
| 2019/0332897 A1* | 10/2019 | Chen | G06T 7/215 |
| 2021/0133483 A1* | 5/2021 | Prabhu | G06V 10/454 |

FOREIGN PATENT DOCUMENTS

| CN | 101493944 A | 7/2009 | |
| CN | 106204646 A | 12/2016 | |
| CN | 106650593 A * | 5/2017 | |
| CN | 109446978 A | 3/2019 | |
| CN | 112529941 A * | 3/2021 | ........... G06K 9/6215 |
| KR | 20210010408 A | 1/2021 | |

OTHER PUBLICATIONS

Bertinetto L., V. J. Fully-Convolutional Siamese Networks for Object Tracking. In: Hua G., Jegou H. (eds) Computer Vision—ECCV 2016 Workshops. Springer. 2016.
Guillermo Gallego, T. D. Event-based Vision: A Survey. IEEE Transactions on Pattern Analysis and Machine Intelligence, 2020. 2020.

(Continued)

*Primary Examiner* — Vincent Rudolph
*Assistant Examiner* — Meredith Taylor

(57) ABSTRACT

Systems and methods are described for performing a computer vision task on a sequence of frames. A first frame and a second frame are obtained, corresponding to a first timestep and a second timestep, respectively, in a sequence of frames. A differential image is computed between the first frame and the second frame. A predicted output is generated by forward propagating the differential image through a neural network that is trained to perform a computer vision task.

20 Claims, 10 Drawing Sheets

(56) References Cited

OTHER PUBLICATIONS

Hiroshi Sato, T. O. Multimodal Attention Fusion for Target Speaker Extraction. 2021 IEEE Spoken Language Technology Workshop (SLT). Shenzhen: IEEE. 2021.
Li, B. A. SiamRPN++: Evolution of Siamese Visual Tracking With Very Deep Networks. Proceedings of the IEEE/CVF Conference on Computer Vision and Pattern Recognition (CVPR) 2019.
Manzanera, A., & Julien, C. A new motion detection algorithm based on Σ-Δ background estimation. Pattern Recognition Letters 2007.
Nicolai Wojke, A. B. Simple Online and Realtime Tracking with a Deep Association Metric. International Conference on Image Processing (ICIP). Beijing, China: IEEE. 2017.
Shweta, S., & P.A., G. Movement Detection Using Image Processing. International Journal of Science and Research (IJSR). 2013.
Szeliski, R. Image Alignment and Stitching: A Tutorial. foundations and trends in computer graphics and vision 2006.
Wei Li, Y. X. SMOT: Single-Shot Multi Object Tracking. eprint arXiv:2010.16031. arXiv. 2020.
Feng Jie et al: "Improved SiamRPN++ with Clustering-Based Frame Differencing for Object Tracking of Remote Sensing Videos", 2021 IEEE International Geoscience and Remote Sensing Symposium IGARSS, IEEE, Jul. 11, 2021 (Jul. 11, 2021), pp. 4163-4166, XP033986024.

\* cited by examiner

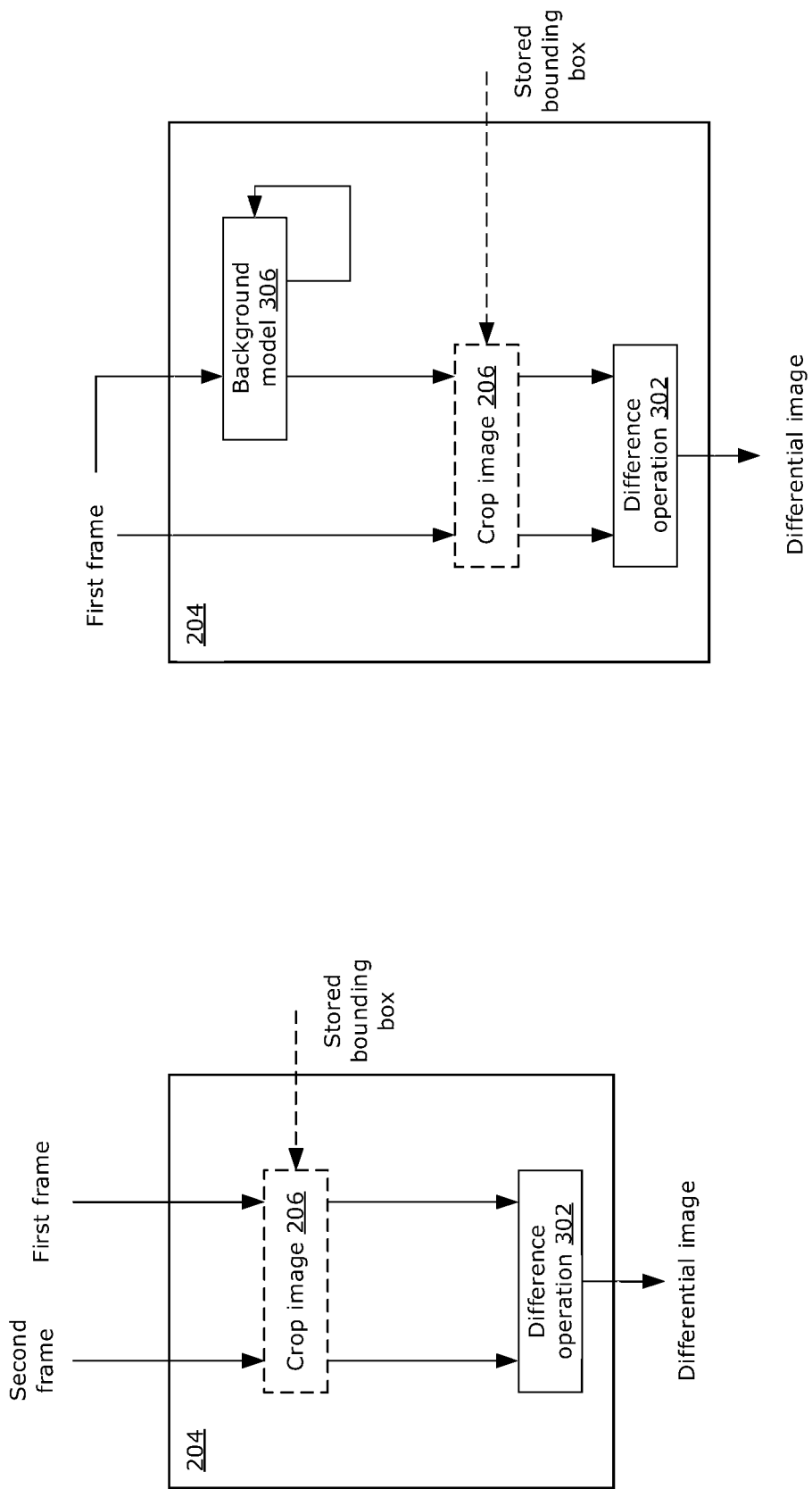

SYSTEMS AND METHODS FOR PERFORMING COMPUTER VISION TASK USING A SEQUENCE OF FRAMES

CROSS-REFERENCE TO RELATED APPLICATIONS

The present application claims priority to U.S. provisional patent application No. 63/225,787, entitled "SYSTEMS AND METHODS FOR OBJECT TRACKING IN A SEQUENCE OF FRAMES", filed Jul. 26, 2021, the entirety of which is incorporated by reference herein.

TECHNICAL FIELD

The present disclosure relates to systems and methods for performing a computer vision task such as object tracking using a sequence of frames, including systems and methods that use differential images computed from the sequence of frames for performing the computer vision task.

BACKGROUND

Object tracking is a common computer vision task. The task of object tracking may be framed as a task of establishing object correspondence between consecutive frames of a video. Object tracking may refer to online object tracking or offline object tracking. In online object tracking, object tracking is performed for a current frame without access to any future frames (e.g., online object tracking may be performed on live (or real-time) video frames). In offline object tracking, objecting tracking that is performed in a current frame may access both past frames as well as future frames. The use of neural networks for object tracking has been of interest, and has shown improvements over classical (i.e., non-neural network-based) techniques.

Some existing neural network-based object tracking techniques rely on object detection performed in each individual frame, and generate track associated with each detected object. Such detection-based techniques typically require separate neural networks to perform the detection and the tracking, which may be computationally expensive.

Other existing neural network-based object tracking techniques rely on feature extraction from each frame and matching of features between frames, to track the location of an object. However, such techniques still require the neural network to process each frame.

Accordingly, there is a desire to provide a more efficient neural network-based solution for object tracking and other computer vision tasks.

SUMMARY

In various examples, the present disclosure describes systems and methods that make use of temporal information between frames (e.g., consecutive frames, or temporally-correlated frames) of a video as input to a neural network to perform a machine vision task, such as object tracking. In some examples, the present disclosure describes an approach in which a differential image is computed between a first frame (e.g., a frame at a current timestep) and a second frame (e.g., a frame at a previous timestep, where the first and second frames may be consecutive frames) of a video. This differential image is used as input to a neural network, rather than the original frames of the video.

The examples described herein provide technical advantages in that there is an improvement in efficiency because the differential image that is inputted to the neural network provides explicit temporal information between frames (i.e., information that changes between frames) (e.g., compared to existing techniques that process each frame individually), which enables the neural network to more efficiently make use of the temporal information. Another technical advantage provided by examples of the present disclosure is that computing differential information (i.e., a change in information) between frames is typically more computationally efficient compared to computing all information contained in a single frame. Further, a neural network can use this differential information to more efficiently perform a machine vision task that requires temporal information, such as object tracking, video captioning or visual question answering, among others.

In some examples, preprocessing techniques are described, to help improve the signal to noise ratio (SNR) of a differential image. Techniques such as image alignment, low-pass filtering, dynamic noise threshold and/or signal check may be used in combination. In some examples, preprocessing techniques may provide the technical advantage that only differential images having useful information (e.g., having information that is more than a noise threshold) is processed by the neural network. This may enable more effective selection of which differential images should be inputted to the neural network for performing the machine vision task (e.g., object tracking) and which differential images do not need to be processed by the neural network.

The present disclosure describes examples in which both differential images and non-differential images (e.g., the original frame, or a cropped image from the original frame) are processed by the neural network. Various examples are described that perform feature fusion of a differential image and a non-differential image (e.g., corresponding to a single captured frame). The feature fusion may be performed at various stages, which can all be supported within the framework of the disclosed systems and methods. This provides the technical advantage that the information contained in the original frame can also be exploited.

In an example aspect, the present disclosure describes a method including: obtaining a first frame corresponding to a first timestep in a sequence of frames, and a second frame corresponding to a second timestep in the sequence of frames; computing a differential image between the first frame and the second frame; and generating a predicted output by forward propagating the differential image through a neural network that is trained to perform a computer vision task.

In the preceding example aspect of the method, the neural network may be trained to perform an object tracking task, and the predicted output may include a predicted bounding box for a tracked object contained in the first frame.

In the preceding example aspect of the method, the method may include obtaining a stored bounding box that was predicted for the second frame. The differential image may be computed for a defined region of interest (ROI) in the first frame and the second frame, the defined ROI being defined based on the stored bounding box.

In any of the preceding example aspects of the method, the method may include: performing a signal check on the differential image to determine whether a signal representing an amount of useful information carried in the differential image passes a noise threshold; and forward propagating the differential image though the neural network responsive to passing the noise threshold.

In the preceding example aspect of the method, the noise threshold may be a static predefined noise threshold.

In the preceding example aspect of the method, the noise threshold may be a dynamic spatiotemporal noise threshold.

In any of the preceding example aspects of the method, the signal may be computed using a subset of pixels sampled from the differential image.

In any of the preceding example aspects of the method, the first frame and the differential image may be both forward propagated through the neural network, and the neural network may be trained to perform feature fusion to combine features of the first frame or the second frame and features of the differential image, to generate the predicted output.

In any of the preceding example aspects of the method, the method may include: performing image alignment between the first frame and the second frame, wherein the differential image is computed between the aligned first frame and the second frame; and performing low-pass filtering on the differential image, wherein the low-pass filtered differential image is forward propagated through the neural network.

In any of the preceding example aspects of the method, the neural network may be trained to perform a video captioning task or a visual question answering task.

In an example aspect, the present disclosure describes a computing system including a processing unit configured to execute instructions to cause the computing system to perform any of the preceding example aspects of the method.

In an example aspect, the present disclosure describes a computer readable medium having instructions encoded thereon, wherein the instructions, when executed by a processing unit of a computing system, cause the computing system to perform any of the preceding example aspects of the method.

In an example aspect, the present disclosure describes a computer program comprising instructions which, when the program is executed by a computing system, cause the computing system to perform any of the preceding example aspects of the method.

BRIEF DESCRIPTION OF THE DRAWINGS

Reference will now be made, by way of example, to the accompanying drawings which show example embodiments of the present application, and in which:

FIGS. 3A-3C illustrate examples for computing a differential image, which may be implemented in the example computer vision module of FIG. 2;

Similar reference numerals may have been used in different figures to denote similar components.

DETAILED DESCRIPTION

Figure 1:
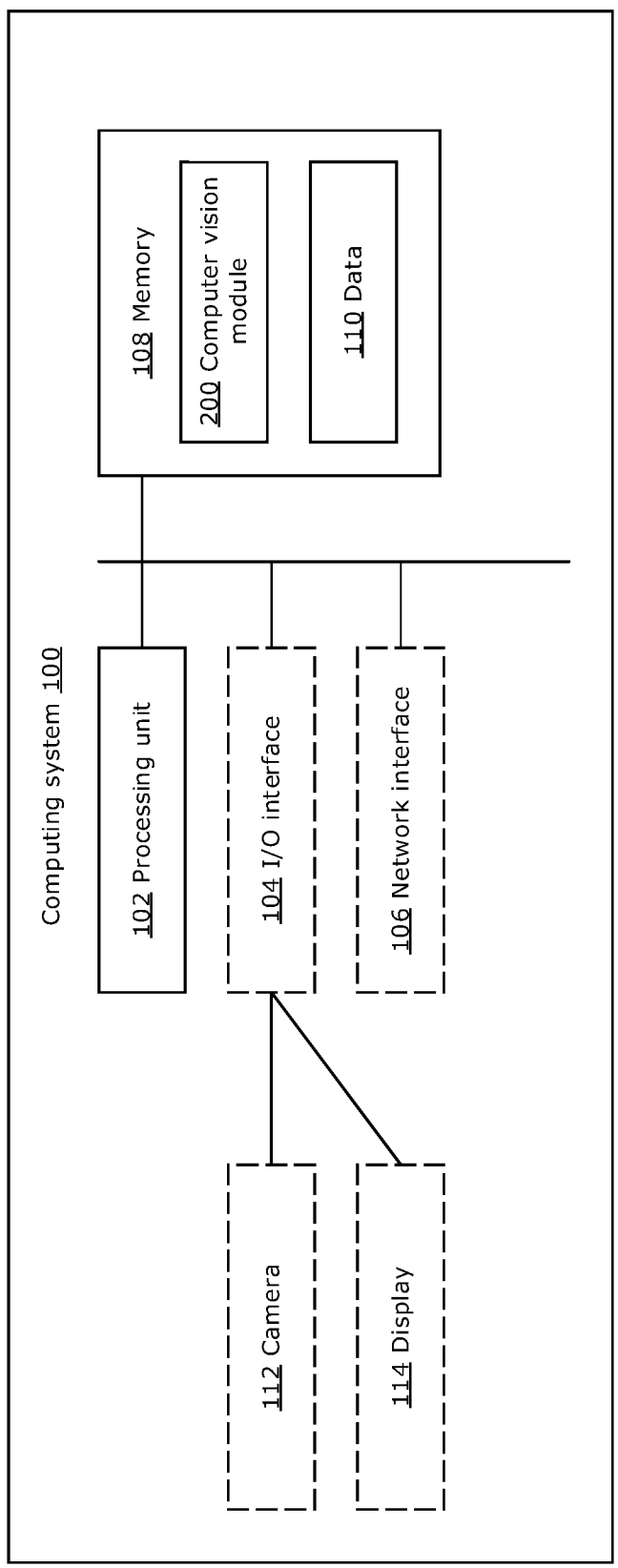
FIG. 1 is a block diagram illustrating some components of an example computing system, which may be used to implement examples of the present disclosure.

The present disclosure describes examples in which a neural network is trained to perform a machine vision task, such as object tracking. Although object tracking is described in some examples, it should be understood that the present disclosure is not limited to this application. For example, the present disclosure may be applicable to the performance of other machine vision tasks, including machine vision tasks that require temporal information (e.g., video captioning, visual question answering, or other video processing tasks). The present disclosure makes reference to frames of a video (e.g., where each frame contains RGB data), however it should be understood that the present disclosure is not limited to video data and may be applicable to any data that is captured as a sequence of frames, including a sequence of infrared (IR) frames or a sequence of depth frames. Further, although the present disclosure describes examples in which a sequence of frames is processed online (i.e., without use of frames in a future timestep), it should be understood that the present disclosure may also be applicable to processing of a sequence of frames offline.

To help assist in understanding the present disclosure, some existing techniques for object tracking are first discussed. Neural network-based object tracking techniques may be generally categorized as tracking based on object detection, and tracking based on location of objects in previous frames.

In existing approaches that use detection based tracking, object detection is typically performed individually on each frame and tracks are associated to each detected object as the sequence of frames is processed (e.g., described by Wojke et al., "Simple Online and Realtime Tracking with a Deep Associated Metric", *ICIP,* 2017). Because object detection is performed on each frame individually, temporally correlated information (which is contained over two or more frames) is extracted and used inefficiently. Moreover, this approach often requires the use of separate neural networks to perform the object detection and the tracking task, which may be an inefficient use of feature information between the two neural networks. The requirement for two separate neural networks may also be computationally expensive (e.g., requiring significant processing power and/or memory resources), which may be prohibitive in computing systems with limited resources. Some existing solutions propose combining the object detection and tracking tasks into a single combined task, which is performed by a single neural network (e.g., as described by Li et al., "SMOT: Single-Shot Multi Object Tracking", *eprint arXiv:*2010.16031, 2020), however this approach still processes frames individually and does not make efficient use of temporally correlated information between frames.

In existing approaches that perform tracking based on the location of objects in previous frame(s), state-of-the-art techniques are typically based on Siamese networks (also referred to as twin networks). Object tracking is approached as template matching problem, in which features of a detected object from a previous frame are matched against proposed regions in a current frame and the object location in the current frame is determined based on the best match (e.g., as described by Bertinetto et al., "Fully-Convolutional Siamese Networks for Object Tracking", In: Hua G., Jégou H. (eds) *Computer Vision—ECCV* 2016 *Workshops,* 2016; and Li et al., "SiamRPN++: Evolution of Siamese Visual Tracking With Very Deep Networks", *Proceedings of the IEEE/CVF Conference on Computer Vision and Pattern Recognition* (*CVPR*), pp. 4282-4291, 2019). The feature extraction is performed on each frame individually, and may not make efficient use of temporal information since most of the information in consecutive frames is shared.

Some approaches to motion detection and object tracking use classical (i.e., non-machine learning-based) computer vision approaches. An existing approach is to filter out the background in a sequence of frames and using classical computer vision to perform object tracking in the filtered frames. However, the performance of classical computer vision object tracking techniques may be poor compared to those that make use of neural networks.

Some existing approaches make use of additional hardware components, such as event cameras, to detect where in space a change has occurred (e.g., as described by Gallego et al., "Event-based Vision: A Survey", *IEEE Transactions on Pattern Analysis and Machine Intelligence,* 2020). However, event cameras cannot capture information about the intensity of change. Further, the need for additional hardware limits the practical application of such an approach.

The present disclosure describes systems and methods that help to address at least some of the drawbacks described above. In particular, the present disclosure describes systems and methods in which differential images are computed and used as input to a neural network.

FIG. 1 is a block diagram showing some example components of a computing system 100, which may be used to implement example embodiments of the present disclosure. Although an example embodiment of the computing system 100 is shown and discussed below, other embodiments may be used to implement examples disclosed herein, which may include components different from those shown. Although FIG. 1 shows a single instance of each component, there may be multiple instances of each component shown.

The computing system 100 includes at least one processing unit 102, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an optional input/output (I/O) interface 104, which interfaces with optional input devices such as a camera 112 and/or optional output devices such as a display 114. Optional input and/or output devices may be integrated with the computing system 100 (as shown in FIG. 1), or may be external devices that are coupled to the computing system 100. The computing system 100 may include (or may be coupled to) other input devices (e.g., mechanical buttons, microphone, touchscreen, keyboard, infrared sensor, etc.) and/or other output devices (e.g., speaker, vibration unit, etc.). The camera 112 (or other input device) may have capabilities for capturing a live video (i.e., in real-time or near real-time) as a sequence of video frames. The captured frames of video data may be buffered by the I/O interface 104 and provided to the processing unit 102 to be processed in real-time or near real-time (e.g., within 10 ms). The captured frames of video data may also be outputted by the display 114 in real-time or near real-time. In some examples, in addition to or instead of the camera 112, the computing system 100 may include another sensor that captures a sequence of frames in a different modality (e.g., an IR sensor capturing a sequence of IR frames, or a depth sensor capturing a sequence of depth frames).

The computing system 100 may include an optional network interface 106 for wired or wireless communication with other computing systems and/or a network (e.g., an intranet, the Internet, a P2P network, a WAN and/or a LAN). The network interface 106 may include wired links (e.g., Ethernet cable) and/or wireless links (e.g., one or more antennas) for intra-network and/or inter-network communications. The network interface 106 may enable the computing system 100 to communicate with other computing systems (e.g., a cloud-based computing platform) to access services provided by the other computing systems.

The computing system 100 includes at least one memory 108, which may include a volatile or non-volatile memory (e.g., a flash memory, a random access memory (RAM), and/or a read-only memory (ROM)). In some examples, the computing system 100 may also include an electronic storage unit (not shown), such as a solid state drive, a hard disk drive, a magnetic disk drive and/or an optical disk drive.

The non-transitory memory 108 may store instructions for execution by the processing unit 102, such as to carry out example embodiments described in the present disclosure. For example, the memory 108 may include instructions for executing a computer vision module 200. The computer vision module 200 may be configured to perform any suitable computer vision task, such as object tracking. The memory 108 may include other software instructions, such as for implementing an operating system and other applications/functions. The memory 108 may also include data 110, such as learned parameters for a neural network of the computer vision module 200. The memory 108 may also store temporary data (e.g., in a buffer or short-term cache), such as a second frame or a predicted bounding box.

The computing system 100 may additionally or alternatively execute instructions from an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 2:
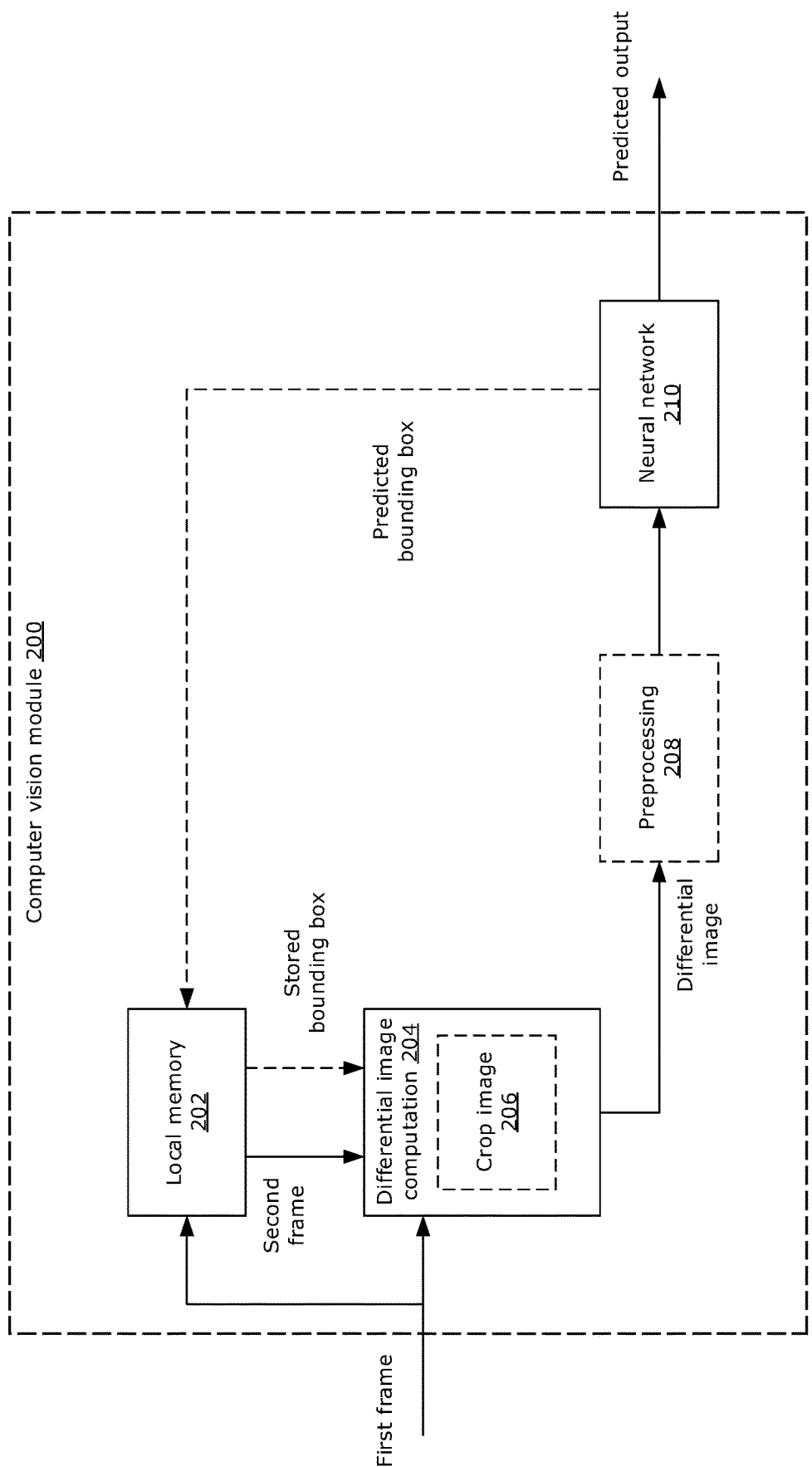
FIG. 2 is a block diagram illustrating an example computer vision module that may be used to implement examples of the present disclosure.

FIG. 2 is a block diagram showing details of an example computer vision module 200, which may be used in example embodiments of the present disclosure. The computer vision module 200 may be configured to perform an object tracking task. In other examples, the computer vision module 200 may be configured to perform other computer vision tasks, including computer vision tasks that require temporal information, such as video captioning or visual question answering tasks.

The computer vision module 200 in this example includes a local memory 202 (which may be a temporary memory, such as a buffer or a cache), a differential image computation submodule 204, an optional preprocessing submodule 208 and a neural network 210. Although FIG. 2 illustrates certain submodules (or functional blocks) of the computer vision module 200, it should be understood that this is not intended to be limiting. For example, the operations of the differential image computation submodule 204 and/or optional preprocessing submodule 208 may be performed by a single submodule (or functional block), or may be a function of the overall computer vision module 200. Further, instead of the local memory 202, the computer vision module 200 may instead access a buffer, cache or other storage unit of the memory 108 of the computing system 100.

The computer vision module 200 obtains a first frame at a first timestep (e.g., a real-time, current frame of a live captured video obtained from the camera 112 of the computing system 100, or a stored frame of a previously captured video obtained from the memory 108), and outputs a predicted output related to the computer vision task. For example, if the computer vision task is object tracking, the predicted output may be a bounding box of a tracked object in the first frame.

The first frame is stored in the local memory 202 (to be used in processing of a next frame) and also provided as input to the differential image computation submodule 204. The differential image computation submodule 204 also obtains a second frame from the local memory 202. If the first frame corresponds to a first timestep denoted as t, the second frame corresponds to a second timestep denoted as t-Δt, where Δt is any nonzero integer. If Δt is a positive nonzero integer, then the second frame may be a previous frame in the sequence of frames; if Δt is a negative nonzero integer, then the second frame may be a future frame in the sequence of frames (e.g., in the case where the sequence of frames is a previously captured and stored sequence of frames). In the case where Δt is +/−1, then the second frame and the first frame are consecutive frames of a sequence of frames. As will be discussed further below, Δt may be a variable integer, meaning the timestep interval between the second frame and the first frame may be variable.

The differential image computation submodule 204 computes the differential image between the second frame and the first frame. The differential image contains information that has changed between the second and first frames (which may be referred to as temporal information). If the first frame is the initial frame in the sequence of frames to be processed by the computer vision module 200, no differential image may be computed.

Optionally, the differential image computation submodule 204 may compute the differential image only for a ROI within the first frame, rather than for the entire frame. For example, the differential image computation submodule 204 may include a crop image functional block 206, which crops the second frame and the first frame to a ROI. The differential image may then be computed only for the cropped ROI. This may help to reduce the amount of data that needs to be processed by the neural network 210, and may help to reduce the use of computer resources (e.g., processing power and/or memory resources).

The ROI for cropping the second and first frames may be defined based on the stored bounding box that was previously predicted for an object of interest in the second frame (e.g., the object being tracked). If the first frame is the initial frame in the sequence of frames to be processed by the computer vision module 200, object detection may be performed on the first frame to determine a bounding box for an object of interest, which may be stored in the local memory 202 (to be used as the stored bounding box for processing of the next frame).

The crop image functional block 206 uses the stored bounding box to define the ROI, for example based on an assumption that the frames are captured at a sufficiently high rate and the speed with which the object of interest moves is such that the object travels a maximum distance of half the size of the object in any direction. Using this assumption, the ROI may be defined as a region that is twice the dimensions of the stored bounding box and centered on the stored bounding box. It should be understood that the ROI may be defined in other ways, depending on the application (e.g., the ROI may be defined to be larger if the frames are captured at a lower frame rate or the object of interest is expected to be moving at higher speeds; conversely, the ROI may be defined to be smaller if the frames are captured at a higher frame rate or the object of interest is expected to be moving at lower speeds). The crop image functional block 206 crops both the second frame and the first frame to the same ROI (i.e., the same set of pixels).

The differential image computation submodule 204 may compute the differential image using any suitable technique, with or without cropping to the ROI.

Figure 3C:
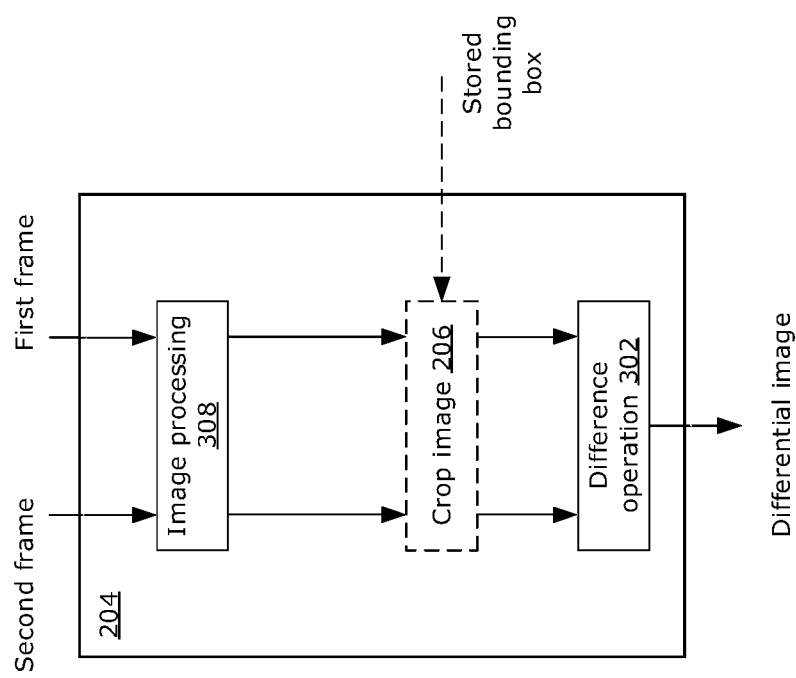

FIGS. 3A-3C are block diagrams illustrating some example implementations of the differential image computation submodule 204 in the computer vision module 200. It should be understood that the implementation of the differential image computation submodule 204 is not necessarily limited to the examples of FIGS. 3A-3C.

FIG. 3A illustrates an example implementation in which the differential image computation submodule 204 computes the differential image using a difference operation 302. In particular, the difference operation 302 performs a pixel-wise computation of the intensity difference between the second frame and the first frame. If cropping to the ROI is performed using the crop image functional block 206, the second frame and the first frame may each be cropped to the ROI and the difference operation 302 may perform pixel-wise difference computation specifically between the ROI in the respective frames. In this example, the differential image may be represented using the following equation:

$$\Delta I_t(i,j)=F_t(i,j)-F_{t-\Delta t}(i,j)$$

where $\Delta I_t$ is the differential image computed at timestep t, (i,j) denotes the pixel location, $F_t$ denotes the first frame and $F_{t-\Delta t}$ denotes the second frame (at timestep t-Δt). If image cropping was performed, the pixel location (i,j) corresponds to the set of pixels in the defined ROI; if image cropping was not performed, the pixel location (i,j) corresponds to all pixels in the second and first frames. The example of FIG. 3A may be the simplest and most computationally efficient method for implementing the differential image computation submodule 204, and may be suitable in many applications.

FIG. 3B illustrates another example implementation in which the differential image computation submodule 204 uses a background model 306. The background model 306 is a statistical model of previously processed frames, which is updated by the first frame. For example, the background model 306 may be represented by the following equation:

$$B_t(i,j)=(1-\alpha)B_{t-\Delta t}(i,j)+\alpha F_t(i,j)$$

where $B_t$ is the background model 306 (updated at timestep t), $B_{t-\Delta t}$ is the previous version of the background model 306, and α is a predefined constant that defines the rate at which the background model 306 is updated. The constant α may be manually tuned, for example, to control how much the background model 306 is updated by the first frame. In a special case, the background model 306 may be designed to compute a moving average (i.e., computed over a sliding window of a defined number of frames) or may be a cumulative average (i.e., computed over all previously processed frames), for example. It should be understood that other statistical methods may be used to compute the background model 306. Optionally, the crop image functional block 206 may crop both the background model 306 and the first frame to the ROI (defined based on the stored bounding block). The difference operation 302 performs a pixel-wise computation of the intensity difference between the background model 306 and the first frame (or specifically between the ROI of the background model 306 and the ROI of the first frame, if image cropping is performed) to generate the differential image. The example implementation of FIG. 3B may be useful to average out random noise that may be present in the frames, for example.

FIG. 3C illustrates another example implementation in which the differential image computation submodule 204 includes an image processing functional block 308. The image processing functional block 308 may perform any image processing operation that may help to refine or reduce the second and first frames to features of interest. The image processing functional block 308 may perform any image processing operation that preserves spatial information (e.g., does not swap pixel locations) in the second and first frames. For example, the image processing functional block 308 may be implemented using a low-pass filter, or may be implemented using an intensity threshold, among other possibilities. Optionally, the crop image functional block 206 may crop both the processed second frame and the processed first frame to the ROI (defined based on the stored bounding block). The difference operation 302 performs a pixel-wise computation of the intensity difference between the processed second frame and the processed first frame (or specifically between the ROI of the respective processed frames, if image cropping is performed) to generate the differential image.

It should be understood that the differential image computation submodule 204 may be implemented in other ways, with or without image cropping.

Reference is again made to FIG. 2. The output of the differential image computation submodule 204 is the differential image. Optionally, the differential image may be preprocessed at a preprocessing submodule 208. For example, the preprocessing submodule 208 may process the differential image to improve the SNR of the differential image before input to the neural network 210. The preprocessing submodule 208 may, for example, perform image alignment or low-pass filtering similar to that described further below. It should be noted that the preprocessing performed at the preprocessing submodule 208 is not necessarily limited to preprocessing that is related to SNR, and may be application dependent and/or dependent on the expected input at the neural network 210 (e.g., resizing of the differential image or normalization of intensity values). In some examples, preprocessing may not be required (e.g., the neural network 210 is not sensitive to noise, or the captured frames are expected to be high quality) and the preprocessing submodule 208 may be omitted.

The differential image is inputted to the neural network 210. The neural network 210 forward propagates the different image to extract features (i.e., compute an embedding) from the differential image. These features are used by the neural network 210 to perform the computer vision task and generate the predicted output. For example, if the computer vision task is object tracking, the neural network 210 performs localization of the object of interest and outputs predicted coordinates of the bounding box for the first timestep (i.e., the predicted bounding box). In some examples, the predicted bounding box may be stored in the local memory 202, to be used as the stored bounding box to define the ROI for image cropping of a next frame.

It should be understood that the neural network 210 may have any desired architecture depending on the computer vision task. In the case where the compute vision task requires temporal information (e.g., object tracking, video captioning, etc.), the neural network 210 may have a memory module whose memory states are updated based on the embedding computed at each timestep. In some examples, the memory states of the memory module (if used) may be reset, for example after a predefined number of timesteps.

The neural network 210 may be trained ahead of time during a training phase, using annotated training data. For example, if the neural network 210 is to be trained to perform an object tracking task, the training data may be annotated frames of video, where the annotations include object labels and track identifiers assigned to each tracked object contained in the frames of video. The training data may be processed through the submodules of the computer vision module 200 in the manner described above, such that the training input to the neural network 210 is a differential image computed from the training data. Training of the neural network 210 may be carried out using any suitable training method. For example, a loss may be computed between the ground-truth annotations in the training data and the predicted output from the neural network 210, and the gradient of the loss may be backpropagated to learn the values of the weights of the neural network 210. The trained neural network 210 may be executed during the application phase, to generate the predicted output.

Figure 4:
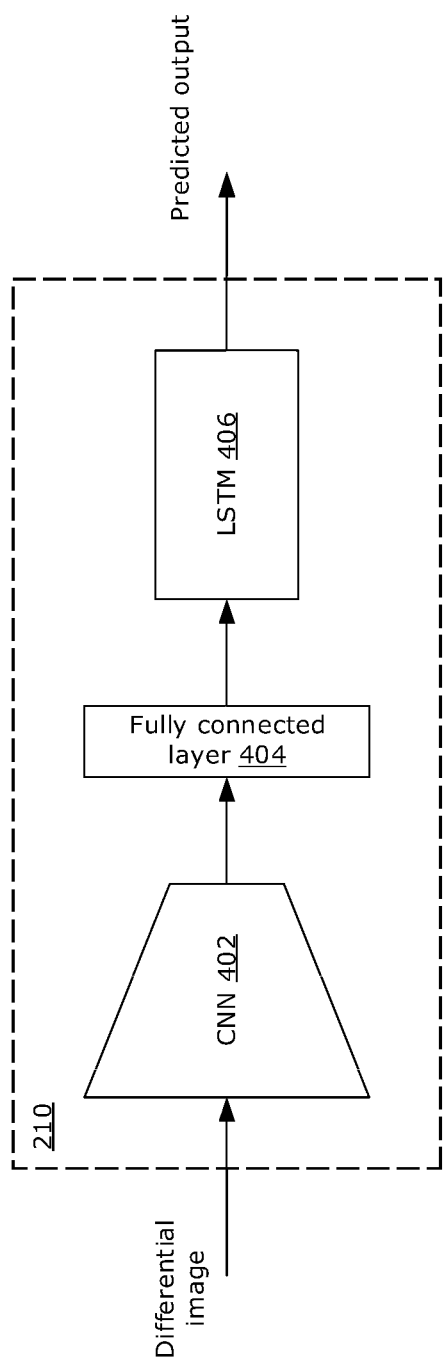
FIG. 4 illustrates an example neural network, which may be implemented in the example computer vision module of FIG. 2.

FIG. 4 is a block diagram illustrating an example implementation of the neural network 210 in the computer vision module 200. It should be understood that the implementation of the neural network 210 is not necessarily limited to the example of FIG. 4.

In this example, the neural network 210 comprises a convolutional neural network (CNN) 402, a fully connected layer 404 and a long-short term memory (LSTM) 406. The differential image is received into the CNN 402, which encodes the differential image into a feature representation (i.e., embedding). The embedding is forward propagated through the fully connected layer 404, which further processes the embedding into a format suitable for input to the LSTM 406 (e.g., converts the embedding into a linear embedding). The embedding is further propagated through the LSTM 406. The memory state of the LSTM 406 is updated based on the embedding. The LSTM 406 serves to track feature information over time. Finally, the output from the LSTM 406 is the predicted output (e.g., a predicted bounding box for an object of interest, in the case where the neural network 210 is designed to perform an object tracking task).

It should be understood that other architectures may be used for the neural network 210. Further, the neural network 210 may be designed for other computer vision tasks, other than object tracking. For example, the CNN 402 and the fully connected layer 404 may be replaced by any suitable feature extraction network, which may include convolutional layers, fully connected layers, etc. The LSTM 406 may be any memory unit, such as a recurrent neural network (RNN) or a gated recurrent unit (GRU), among other possibilities.

Figure 5:
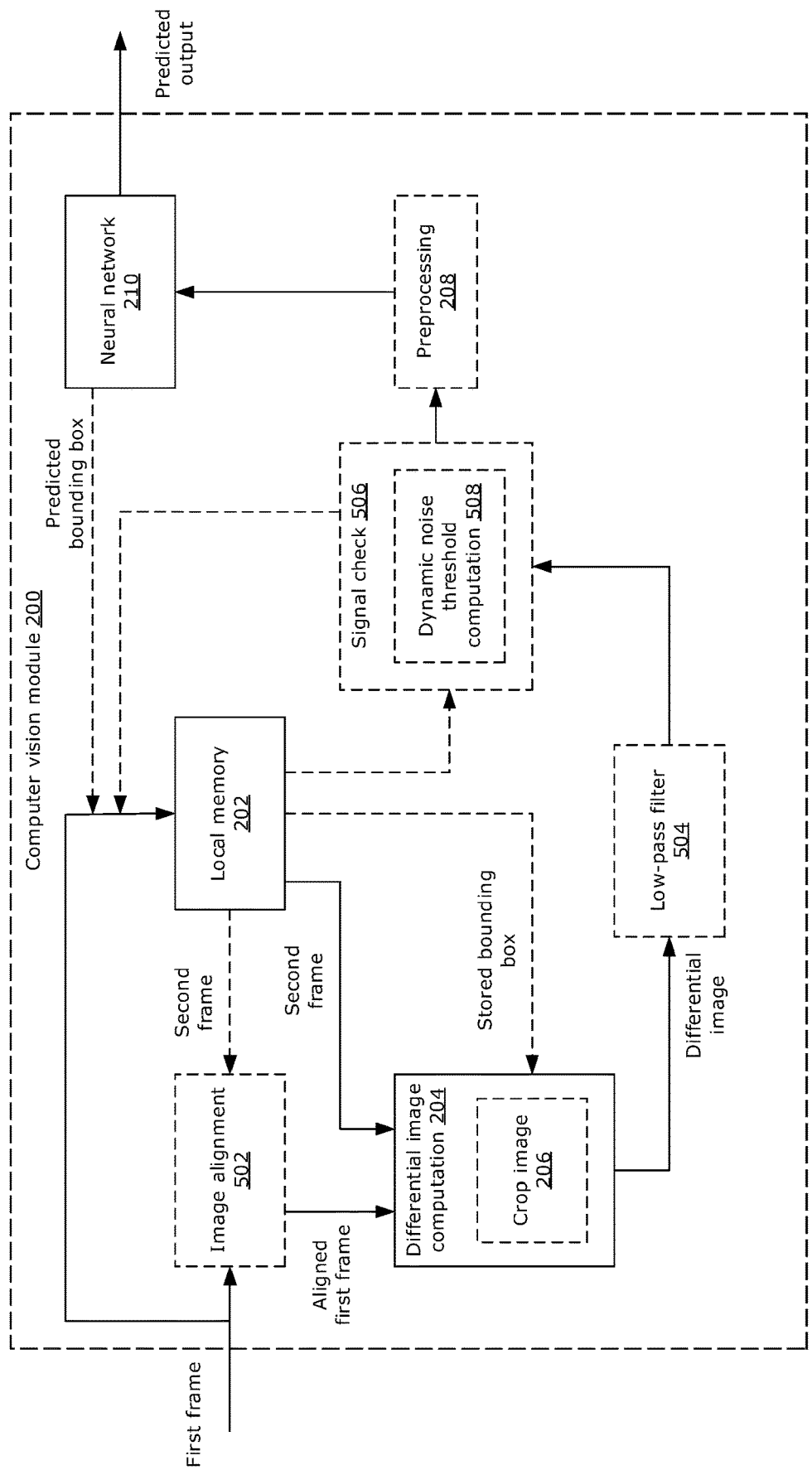
FIG. 5 is a block diagram illustrating another example computer vision module, which includes components for improving the signal-to-noise ratio, that may be used to implement examples of the present disclosure.

FIG. 5 is a block diagram showing details of another example embodiment of the computer vision module 200. In this example, the computer vision module 200 includes the local memory 202, differential image computation submodule 204 (with optional crop image functional block 206), optional preprocessing submodule 208 and neural network 210 as described above. Additionally, in this example the computer vision module 200 may include an optional image alignment submodule 502, and optional low-pass filter submodule 504 and/or an optional signal check submodule 506. The optional submodules 502, 504 and/or 506 may be implemented to help improve the SNR of the differential image that is inputted to the neural network 210 and/or may help to exclude differential images that do not contain significant temporal information.

The optional image alignment submodule 502 performs operations to align the first frame with the second frame (e.g., obtained from the local memory 202). Various image alignment techniques may be used, such as pixel-based techniques or feature-based techniques (e.g., as described by Szeliski, "Image Alignment and Stitching: A Tutorial", *Foundations and trends in computer graphics and vision*, 2006). Image alignment typically involves warping the first frame (or both the first and second frames) so that corresponding features in the two frames are aligned. Image alignment may help to reduce noise due to shaking of a camera, for example.

The optional low-pass filter submodule 504 performs low-pass filtering (e.g., using a Gaussian filter) on the differential image computed by the differential image computation submodule 204. Low-pass filtering may be useful to suppress high frequency noise in the differential image, for example. For example, temporal information in the differential image may represent motion of a tracked object (e.g., translational movement). This motion is represented in a differential image as a region highlight (e.g., increased intensity) which is typically in the low frequency domain. The low-pass filter submodule 504 may filter out high frequency noise, but retain the desired temporal information. Thus, SNR is improved by the low-pass filtering.

The optional signal check submodule 506 performs operations to determine whether the information contained in the differential image is significant (e.g., passes a noise threshold) and passes the differential image to the neural network 210 only if the information is significant. The information contained in the differential image may be evaluated based on the intensity of the pixels in the differential image, for example. The information contained in the differential image may be determined to be significant (and hence the differential image should be processed by the neural network 210) if the number of pixels in the differential image having at least a certain intensity level (e.g., above a noise threshold) is above a threshold number of pixels.

The signal check submodule 506 may include a dynamic noise threshold computation functional block 508, which performs operations to compute a dynamic noise threshold. For example, the dynamic noise threshold computation functional block 508 may use noise variance to compute a noise threshold map that may change over several timesteps (e.g., due to changes captured in the sequence of frames such as changes in the environment, background, ambient light, etc.). Such a noise threshold may be referred to as a spatiotemporal noise threshold, indicating that the noise threshold changes both spatially (i.e., over different pixels) and temporally (i.e., over different timesteps). Computation of the dynamic noise threshold may be based on background estimation techniques (e.g., as described by Manzanera et al. "A new motion detection algorithm based on $\Sigma$-$\Delta$ background estimation" *Pattern Recognition Letters*, pp. 320-328, 2007).

For example, a spatiotemporal noise threshold may be computed as illustrated by the following pseudocode:

a. Initialization at timestep t = 0 :
   i. For each pixel(i, j);
      1. $T_0(i, j) = 0$
b. For each timestep t:
   i. For each pixel(i, j):
      1. $\Delta I_t(i, j) = |I_t(i, j) - I_{t-1}(i, j)|$ 2. Spatial Pooling: $\Delta I'_t(i', j') = \frac{1}{S} \sum_{S \in Image} \Delta I_t(i, j)$ 3. Temporal Pooling: $T_t(i, j) = w_t T_t(i, j) + (1 - w_t) \Delta I'_t(i', j')$ where $T_t$ is the noise threshold at timestep t; $I(i,j)$ is the pixel intensity at pixel location $(i,j)$; $\Delta I_t(i,j)$ is the difference in pixel intensity at pixel location $(i,j)$ (i.e., $\Delta I_t$ represents the differential image at timestep t); $w_t$ is a pooling coefficient at timestep t ($w_t$ can be a fixed coefficient such as 0.5 or it can be a value of a softmax function, for example); and $T_t(i,j)$ is the noise threshold at timestep t and pixel location $(i,j)$, after normalization. Spatial pooling is an operation that computes the average of $\Delta I_t(i,j)$ in a local region (defined by a constant S) around each pixel at location $(i,j)$. It should be noted that, in the example where the dynamic noise threshold computation functional block 508 receives the differential image, computation of the difference $\Delta I_t(i,j)$ may be omitted from the dynamic noise threshold computation (instead, the difference $\Delta I_t(i,j)$ may be determined directly from the differential image, which was computed prior to the dynamic noise threshold computation).

In the computation of the dynamic noise threshold, the pixel location $(i,j)$ corresponds to the pixels of the differential image. If the differential image is computed only for a defined ROI (e.g., if the crop image functional block 206 is used), then the pixels used for computation of the dynamic noise threshold also correspond to the defined ROI (e.g., line a.i and line b.i in the pseudocode may be for each pixel $(i,j)$ in the ROI). If the differential image is computed for the entire frame, then the pixels used for computation of the dynamic noise threshold also correspond to the entire frame. In some examples, only a sample of pixels in the differential image may be used to compute the dynamic noise threshold. For example, pixels may be sampled uniformly (e.g., every n pixels, where n is a positive integer greater than one) in the differential image, or pixels may be sampled randomly. Other sampling techniques may be used to sample a subset of pixels in the differential image for computing the dynamic noise threshold.

The dynamic noise threshold may be a quantitative representation of the sum of sensor noise, background motion noise, and camera (or other sensor) shake noise. This dynamic noise threshold may, in some examples, be averaged over a defined number of timesteps (e.g., 10 timesteps), and the average may be used as the dynamic noise threshold. It should be understood that other methods for computing the dynamic noise threshold may be used. For example, other techniques that compute a spatial noise threshold (e.g., using any suitable statistical method) over a moving temporal window may be used. An example statistical method may be to assume a normal distribution for the intensity distribution for a given pixel. Then, the mean and variance of the intensity for that given pixel may be computed (e.g., empirically). The spatial noise threshold may then be set by the mean and variance of each pixel (i.e., the desired temporal information would be an outlier of the noise distribution).

In some examples, the signal check submodule 506 may omit the dynamic noise threshold computation functional block 508, and may use a static noise threshold instead. For example, a static noise threshold may be predefined based on known camera (or other sensor) characteristics (e.g., known sensor noise characteristics).

The signal check submodule 506 performs operations to compare the strength of the signal in the differential image with the noise threshold (whether dynamic or static). The term signal refers to a quantifier that represents the amount of useful information (in particular useful temporal information) carried in the differential image. In some examples, the signal may be simply be the intensity of each pixel in the differential image. It is expected that significant temporal information (e.g., object motion information) in the differential image will result in a signal that exceeds the noise threshold, and if the noise threshold is not exceeded then the differential image is expected to contain insignificant temporal information (and the differential image can be discarded).

For example, the signal check submodule 506 may be perform operations as illustrated by the following pseudocode:

--- a. Signal Estimation.
  i. For frame $F_t$ and its previous frame $F_{t-\Delta t}$:
    1. For each pixel(i, j) :
      a. $\Delta I_t(i, j) = |I_t(i, j) - I_{t-\Delta t}(i, j)|$
      b. $S_t = \text{Signal}(\Delta I_t)$
b. Signal Strength Check:
  i. Initializations:
    1. CCP = 0; CCI = 0;
  ii. For frame $F_t$:
    1. For each pixel(i, j) :
      a. If $S_t(i, j) > T_t(i, j)$:
    a. CCP = CCP + 1
    b. CCI = CCI + ($S_t(i, j) - T_t(i, j)$)

2. $\text{NCP} = \dfrac{\text{CCP}}{\text{Size}(\Delta I)}; \text{NCI} = \dfrac{\text{CCI}}{\text{Size}(\Delta I)}$ 3. if NCP > $\text{Threshold}_{NCP}$ and NCI > $\text{Threshold}_{NCI}$:
  a. Process differential image further

--- where $T_t(i,j)$ is the noise threshold at timestep t at pixel location (i,j) (it should be noted that if the noise threshold is a static noise threshold, then the noise threshold may be constant over all timesteps and/or over all pixels); I(i,j) is the pixel intensity at pixel location (i,j); $\Delta I_t(i,j)$ is the difference in pixel intensity at pixel location (i,j) (i.e., $\Delta I_t$ represents the differential image at timestep t); and Signal($\Delta I_t$) is an optional signal processing function for $\Delta I_t(i,j)$. The signal processing denoted as Signal($\Delta I_t$) may include applying filter(s) and/or dimension reduction, for example. If the signal processing Signal($\Delta I_t$) is not performed, then the signal (denoted $S_t$) may be equal to $\Delta I_t$. CCP denotes the cumulative number of changed pixels (i.e., the count of pixels having a signal above the noise threshold), and CCI denotes the cumulative value of changed intensities (i.e., the cumulative value of all pixel intensities above the noise threshold). NCP denotes the normalized number of changed pixels and NCI denotes the normalized value of changed intensities, where both NCP and NCI are normalized by the size (e.g., number of pixels) of the differential image. $\text{Threshold}_{NCP}$ and $\text{Threshold}_{NCI}$ are first and second predefined cut-off thresholds for NCP and NCI respectively.

It should be noted that, in the example where the signal check submodule 506 receives the differential image, computation of the difference $\Delta I_t(i,j)$ may be omitted from the dynamic noise threshold computation (instead, the difference $\Delta I_t(i,j)$ may be determined directly from the differential image, which was computed prior to the dynamic noise threshold computation).

It should also be noted that, in the above pseudocode, the pixel location (i,j) corresponds to the pixels of the differential image. If the differential image is computed only for a defined ROI (e.g., if the crop image functional block 206 is used), then the pixels used for computation of the signal check also correspond to the defined ROI (e.g., line a.i.1 and line b.ii.1 in the pseudo may be for each pixel (i,j) in the ROI). If the differential image is computed for the entire frame, then the pixels used for computation of the signal check also correspond to the entire frame. In some examples, only a sample of pixels in the differential image may be used to compute the signal check. For example, pixels may be sampled uniformly (e.g., every n pixels, where n is a positive integer greater than one) in the differential image, or pixels may be sampled randomly. Other sampling techniques may be used to sample a subset of pixels in the differential image for computing the signal check.

The above pseudocode includes a first check to determine whether the differential image contains a sufficient number of pixels having a signal above the noise threshold (i.e., check that NCP passes the first threshold $\text{Threshold}_{NCP}$) and additionally includes a second check to determine whether the signal values of the pixels are sufficiently above the noise threshold (i.e., check that NCI passes the second threshold $\text{Threshold}_{NCI}$). This means that even if there is a sufficiently large number of pixels with signal above the noise threshold (i.e., passes the first threshold), the signal in the differential image may still be considered not significant if the signal values of those pixels are only slightly above the noise threshold (i.e., fails the second threshold). Similarly, if there are pixels with signal values much higher than the noise threshold (i.e., passes the second threshold), the signal in the differential image may still be considered not significant if there are not enough pixels with signal above the noise threshold (i.e., fails the first threshold). It should be understood that this is only an example and is not intended to be limiting. For example, the signal check submodule 506 may only check that NCP passes the first threshold $\text{Threshold}_{NCP}$ (without checking the second threshold), or may only check that NCI passes the second threshold $\text{Threshold}_{NCI}$ (without checking the first threshold). In another example, the signal check submodule 506 may only check if there is at least one pixel having a signal above the noise threshold. Other techniques for checking the signal strength against the noise threshold may be used.

Generally, the signal check submodule 506 may perform operations to check whether the differential image contains a signal that is sufficiently high, with the expectation that the differential image with a sufficiently high signal would contain useful temporal information for performing the computer vision task (e.g., object tracking). If the differential image has a sufficiently high signal (i.e., passes the signal check), then the signal check submodule 506 may pass the differential image to the neural network 210 (with optional preprocessing by the preprocessing submodule 208). If the differential image does not have a sufficiently high signal (i.e., fails the signal check), then the differential image may be discarded. This may reduce unnecessary execution of the neural network 210, thus reducing the use of computer resources (e.g., reduced use of processing power and/or memory resources) and improving the efficiency of the computer vision module 200.

The signal check submodule 506 may further determine whether the first frame (and optionally the predicted bounding box for the first frame) should be stored in the local memory 202. For example, the signal check submodule 506 may generate a control signal that causes the first frame (and optionally the predicted bounding box) to not be stored in the local memory 202 (but maintain the second frame that is already stored in the local memory 202) if the differential image fails the signal check. Thus, the second frame that is stored in the local memory 202 may be the most recent frame that contained significant temporal information, which may or may not be the immediately previous frame. That is, if the first frame corresponds to timestep t, the second frame may correspond to timestep t-Δt, where Δt is a variable nonzero integer that may be variable dependent on a control signal from the signal check submodule 506.

The submodules 502, 504, 506 may be used individually or in any combination. The use of any one or more of the submodules 502, 504, 506 may help to improve the operations of the computer vision module 200 by reducing noise and/or saving computer resources. The possibility of false positives (which may be caused by noise in the captured frames) may also be reduced.

In some examples, the input to the neural network 210 may be the first or second frame (or the cropped ROI of the first or second frame) in addition to the differential image. Including the first or second frame (or the cropped ROI of the first or second frame) as input to the neural network 210 may help to improve robustness (e.g., accuracy) of performance of the computer vision task. For example, the first or second frame may contain information that is not captured (or not fully captured) in the differential image (e.g., color information in the first or second frame may not be fully captured in the differential image). Accordingly, the performance of the computer vision module 200 for performing some computer vision tasks (e.g., video captioning or video question answering) may benefit from providing the first or second frame as input to the neural network 210 in addition to the differential image.

Figure 6:
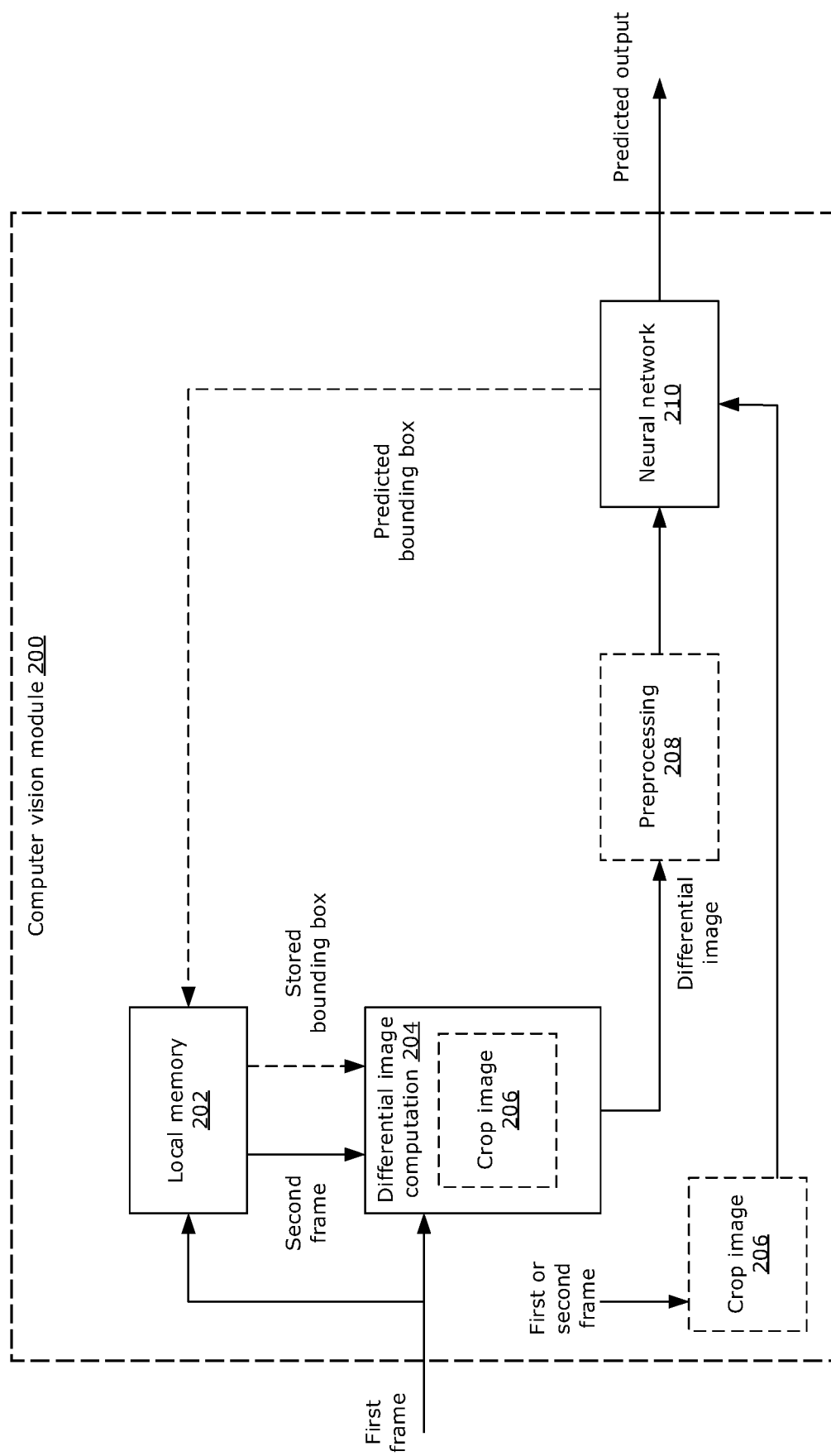
FIG. 6 is a block diagram illustrating another example computer vision module, in which both a differential image and a first frame are provided to the neural network, that may be used to implement examples of the present disclosure.

FIG. 6 is a block diagram showing details of another example embodiment of the computer vision module 200. In this example, the computer vision module 200 includes the local memory 202, differential image computation submodule 204 (with optional crop image functional block 206), optional preprocessing submodule 208 and neural network 210 as described above. The image alignment submodule 502, low-pass filter submodule 504 and signal check submodule 506 (with optional dynamic noise threshold computation functional block 508) are not shown in FIG. 6 for simplicity, however it should be understood that any one or more of the submodules 502, 504, 506 may be included in FIG. 6.

In some examples, if the image alignment submodule 502 and/or the low-pass filter submodule 504 is implemented to improve SNR of the differential image, the same image alignment submodule 502 and/or the low-pass filter submodule 504 may also be used to process the first or second frame prior to input to neural network 210. In other examples, it may not be necessary for the first or second frame to be processed by the same image alignment submodule 502 and/or the low-pass filter submodule 504 (e.g., depending on how the neural network 210 was trained).

In FIG. 6, the first or second frame is also provided as input to the neural network 210. Optionally, if the differential image is computed for a defined ROI, the first or second frame may be cropped to the defined ROI (e.g., using the crop image functional block 206) before being inputted to the neural network 210. At the neural network 210, feature fusion may be performed to enable the neural network 210 to make use of features extracted from both the differential image and the first or second frame.

Fusion of the features from the differential image and the features from the first or second frame may be performed at the neural network 210. The architecture of the neural network 210 may be configured to perform fusion of these two modalities (i.e., differential image and first or second frame) at any suitable stage of the neural network 210.

Figure 7A:
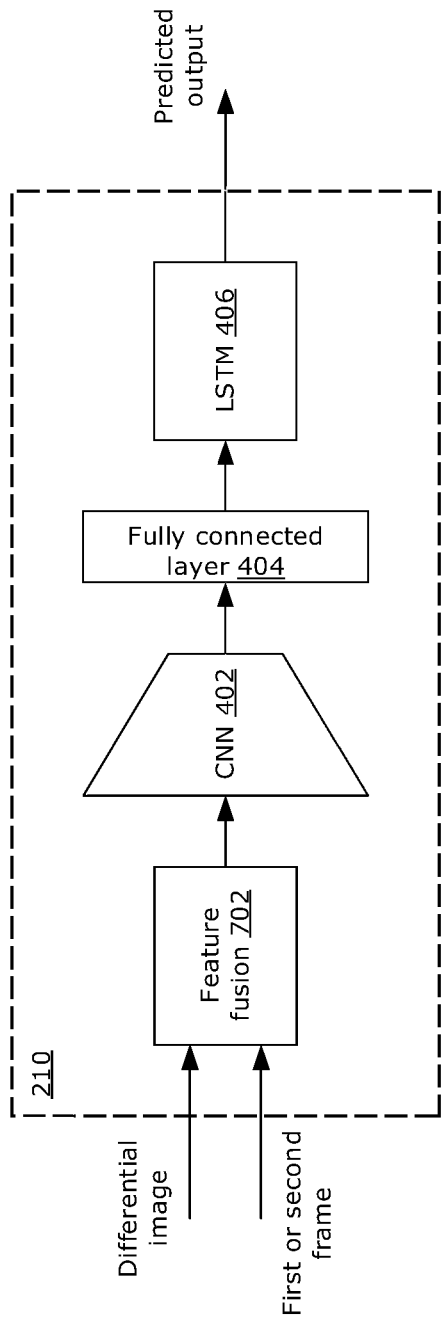
FIGS. 7A-7C illustrate examples of how feature fusion may be implemented in the neural network, which may be used in the example computer vision module of FIG. 6.
Figure 7B:
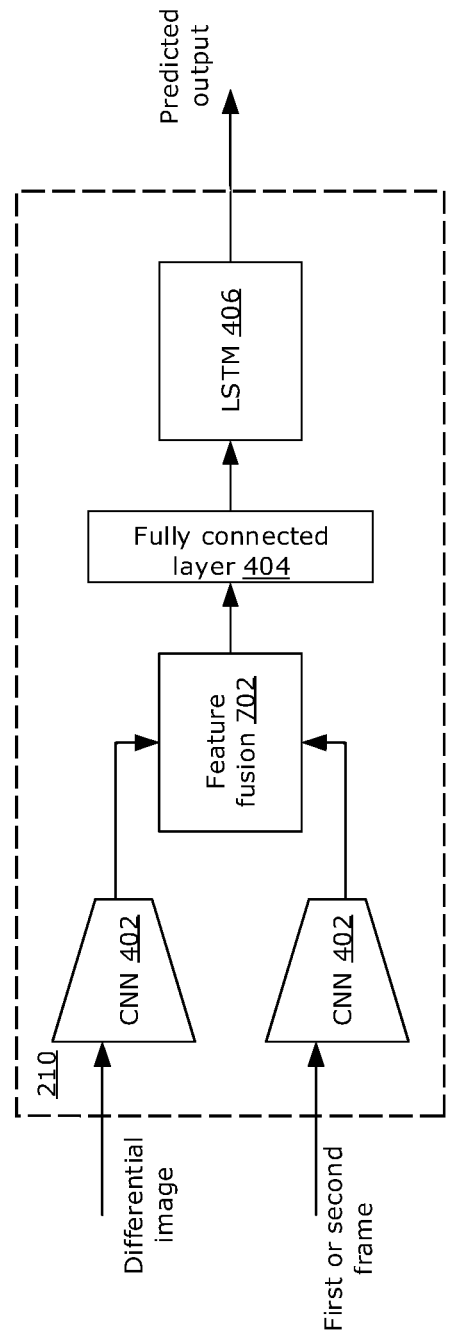
Figure 7C:
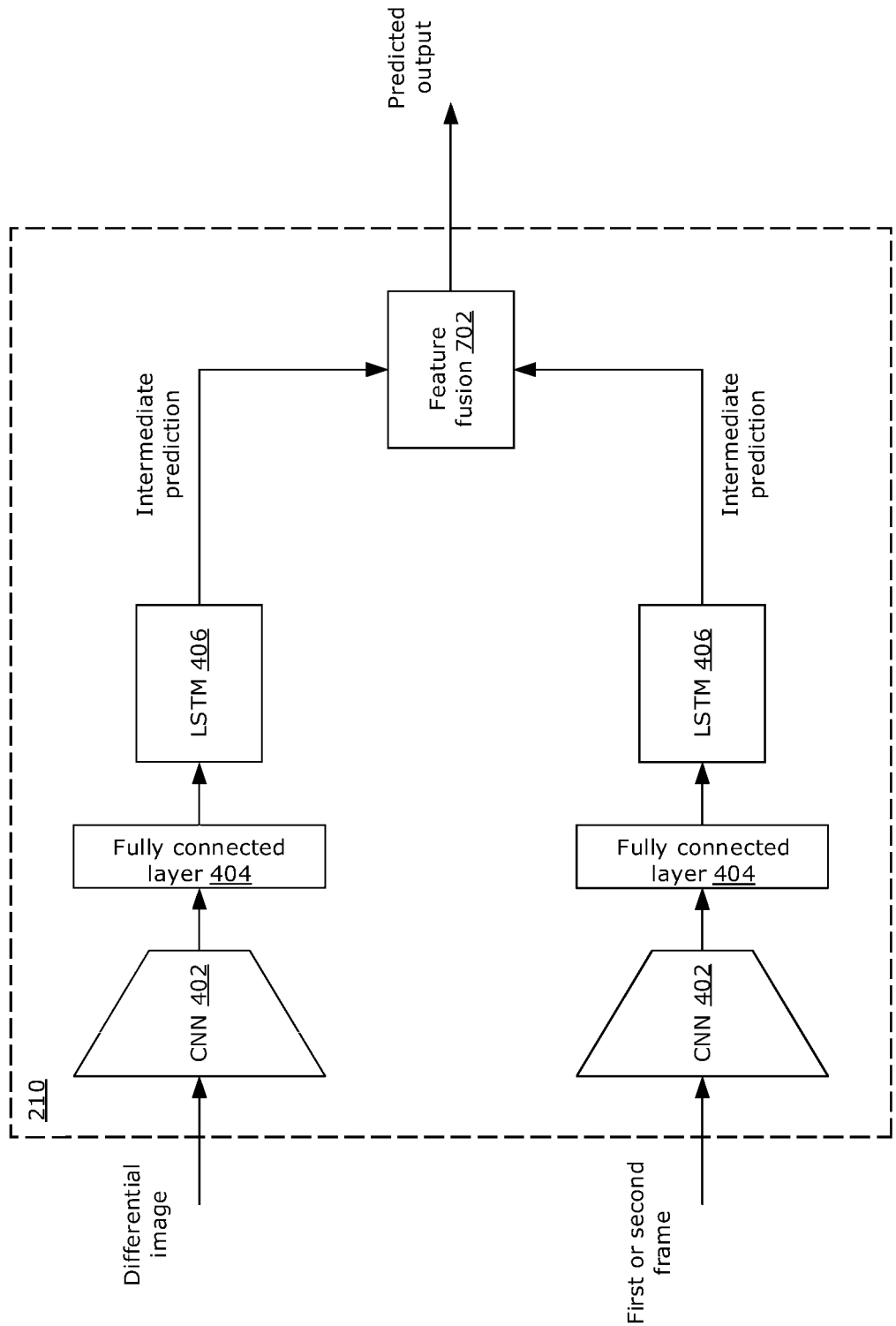

FIGS. 7A-7C illustrate example architectures of the neural network 210, showing different examples of how feature fusion may be implemented. In these examples, the neural network 210 may be based on the building blocks of the CNN 402, fully connected layer 404 and LSTM 406 as described above. It should be understood that this is not intended to be limiting, and feature fusion may be implemented in any other suitable architecture (e.g., another feature extraction network may replace the CNN 402 and fully connected layer 404, and/or another memory unit may replace the LSTM 406).

FIG. 7A illustrates an example in which the neural network 210 implements a feature fusion unit 702 at an early stage of the neural network 210. Specifically, the feature fusion unit 702 in this example performs fusion of features between the differential image and the first or second frame, and the output of the feature fusion unit 702 is provided as input to the CNN 402.

FIG. 7B illustrates an example in which the neural network 210 implements a feature fusion unit 702 at an intermediate stage of the neural network 210. Specifically, the differential image and the first or second frame are each processed by a respective CNN 402 into respective embeddings. The respective embeddings are inputted to the feature fusion unit 702, which performs fusion of features between the respective embeddings, and the output of the feature fusion unit 702 is provided as input to the fully connected layer 404.

FIG. 7C illustrates an example in which the neural network 210 implements a feature fusion unit 702 at a late stage of the neural network 210. Specifically, the differential image and the first or second frame are each processed by a respective branch in the neural network 210 (where each branch includes a respective CNN 402, respective fully connected layer 404 and respective LSTM 406), to generate respective intermediate predictions (i.e., one intermediate prediction from one branch as the result of processing only the differential image, and another intermediate prediction from the second branch as the result of processing only the first or second frame). The respective intermediate predictions are inputted to the feature fusion unit 702, which performs fusion of features between the respective intermediate predictions, and the output of the feature fusion unit 702 is the predicted output of the neural network 210.

The example architecture shown in FIG. 7A may be simpler to implement and/or require fewer computer resources; on the other hand, the example architecture shown in FIG. 7C may enable more specialization of each branch of the neural network 210 (e.g., one branch may be trained to generate predictions from only the differential image and a second branch may be trained to generate predictions from only the first or second frame). It should be understood that the architecture of the neural network 210 may be selected in accordance with various performance goals.

In any of the examples described above, the feature fusion unit 702 may implement any suitable feature fusion operation. For example, the feature fusion unit 702 may perform attention-based fusion (e.g., as described by Sato et al. "Multimodal Attention Fusion for Target Speaker Extraction. 2021 *IEEE Spoken Language Technology Workshop (SLT)*. Shenzhen: IEEE, 2021). For example, in attention-based fusion, the features from each modality can be weighted and fused based on the following equations:

$$z^{fusion} = \sum_{\varphi} \alpha^{\varphi} z^{\varphi}$$

$$\alpha^{\varphi} = \frac{\exp(\varepsilon e^{\varphi})}{\sum_{\varphi} \exp(\varepsilon e^{\varphi})}$$

$$e^{\varphi} = w \tanh(W z^M + V z^{\varphi} + b)$$

where $\varphi \in (\Delta I, F)$ (i.e., $\varphi$ denotes the modality: differential image $\Delta I$ or the first or second frame F); $z^{\varphi}$ denotes the embedding for each modality; w, W, V, b are parameters (e.g., weights) that are learned during training of the neural network 210; and $\varepsilon$ is a selectable sharpening factor. $z^M$ can denote either one of $z^{\Delta I}$ or $z^F$ or a mixture of both. It should be noted that the computation of $e^{\varphi}$ can be performed in other ways than what is presented above. The neural network 210 with the feature fusion unit 702 may be trained using annotated training data, as described above, in an end-to-end manner. By learning the parameters for the feature fusion unit 702, the neural network 210 may be trained to select which modality (i.e., differential image or first or second frame) to emphasize for what features. This may enable the computer vision module 200 to general more robust predicted output for certain computer vision tasks (e.g., video captioning or visual question answering tasks).

Figure 8:
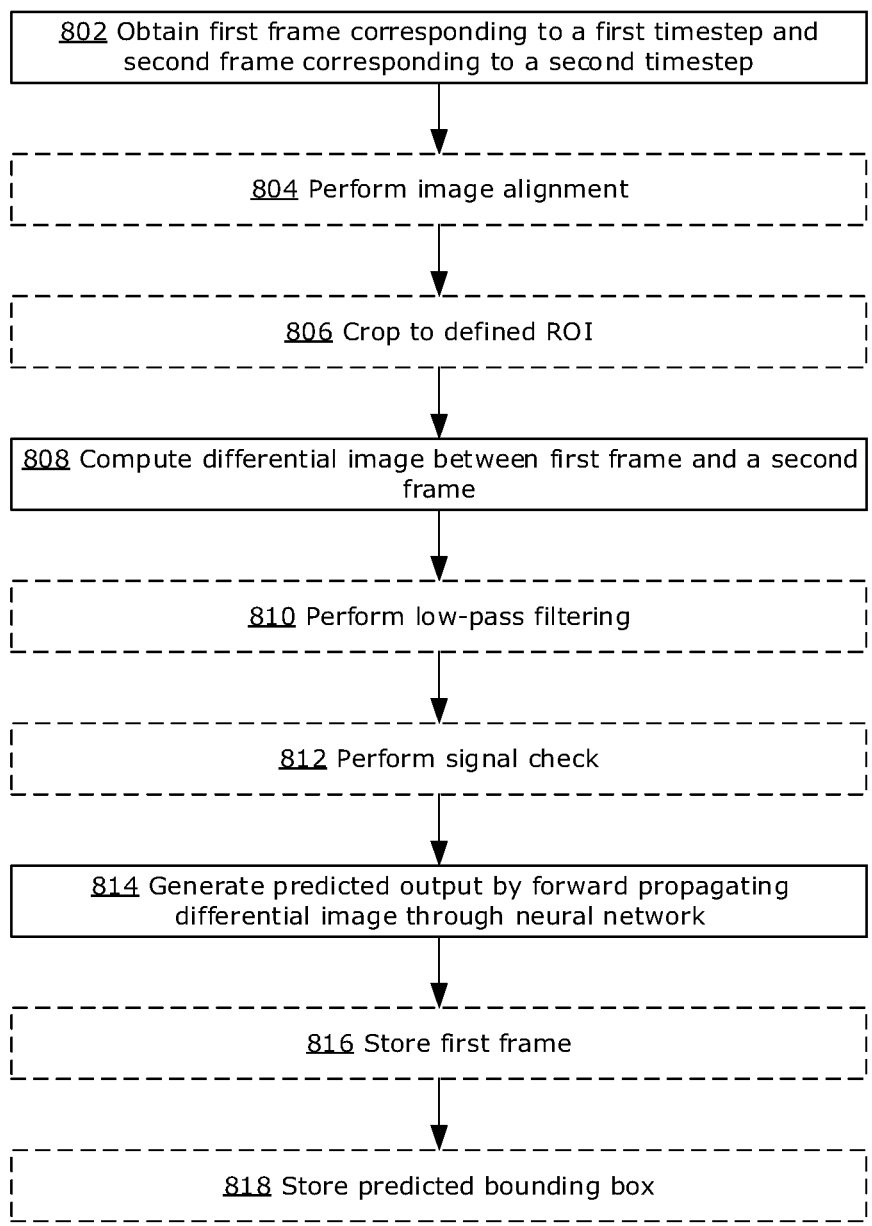
FIG. 8 is a flowchart illustrating an example method for generating a predicted output, in accordance with examples of the present disclosure.

FIG. 8 is a flowchart illustrating an example method 800 for performing a computer vision task. The method 800 may be performed by any suitable computing system (e.g., the computing system 100) using the computer vision module 200, for example. The computer vision module 200 may be the example illustrated in FIG. 2, FIG. 5 or FIG. 6, for example.

At 802, a first frame corresponding to a first timestep in a sequence of frames and a second frame corresponding to a second timestep in the sequence of frames are obtained. The first frame may be a real-time, current frame of a live sequence of frames (e.g., live video), for example. In other examples, the first frame may be a frame of a stored sequence of frames (e.g., a previously captured video). The second frame may correspond to a second timestep that is prior to the first timestep or that is after the first timestep (the second timestep may be after the first timestep if the sequence of frames has been previously captured and stored for all timesteps). The first and second frames may be, for example, frames of a video, frames of depth data, or frames of IR data, among other possibilities.

Optionally, at 804, image alignment may be performed to align the first frame with the second frame. For example, image alignment may be performed using an image alignment submodule 502 of the compute vision module 200, as described above.

Optionally, at 806, the first and second frames may each be cropped to a defined ROI. For example, a ROI may be defined based on a previously predicted bounding box, and cropped using a crop image functional block 206 as described above.

At 808, a differential image is computed between the first and second frames. The differential image may be computed (e.g., using the differential image computation submodule 204) using any suitable technique (e.g., as illustrated in FIGS. 3A-3D) as discussed above.

Optionally, at 810, low-pass filtering may be performed on the differential image (e.g., using the low-pass filter submodule 504).

Optionally, at 812, a signal check may be performed to determine whether the differential image contains significant temporal information (represented by the strength of a computed signal). For example, the signal check submodule 506 as described above may be used to determine whether the differential image contains significant temporal information, based on whether the differential image passes a noise threshold (which may be a dynamic noise threshold or a static noise threshold). Optionally, a dynamic noise threshold may be computed as discussed above. If the differential image contains significant temporal information, the method 800 may proceed to step 814. If the differential image does not contain significant temporal information, the differential image may be discarded and the method 800 may return to step 802 to process the next frame in the sequence of frames.

At 814, a predicted output is generated by forward propagating the differential image through the neural network 210. In some examples, the first or second frame may also be forward propagated through the neural network 210, and feature fusion may be used by the neural network 210, as discussed above. In some examples, preprocessing of the differential image (and optionally the first or second frame) may be performed (e.g., using the preprocessing submodule 208) prior to forward propagation through the neural network 210. The neural network 210 may be a trained neural network that performs a target computer vision task, such as object tracking, video captioning or visual question answering, among other possibilities. The predicted output may be used by other modules of the computing system 100. For example, if the computer vision task is object tracking, the predicted output may be a predicted bounding box of a tracked object in the first frame. In another example, if the computer vision task is video captioning, the predicted output may be a predicted description of a scene in a video, which may be used to generate a text overlay for the video and displayed by the computing system 100.

Optionally, at 816, the first frame is stored (e.g., in the local memory 202 of the computer vision module 200, or in a general memory 108 of the computing system 100), to be used for processing the next frame. If the method 800 is performed offline (i.e., is performed on a previously captured and stored sequence of frames), the first frame may already be stored and step 816 may be omitted.

Optionally, at 818, if a predicted bounding box was generated by the neural network 210 (e.g., for an object tracking task), the predicted bounding box may also be stored (e.g., for use in defining the defined ROI at optional step 806).

The method 800 may return to step 802 to process the next frame in the sequence of frames.

In various examples, the present disclosure describes systems and methods that may provide improvements in computer vision by enabling an explicit focus on the temporal information in a sequence of frames. This may help to reduce the complexity of algorithms required to perform a computer vision task (e.g., object tracking) and/or help to reduce the computational complexity. Further, the focus on temporal information may help to reduce the occurrence of erroneous predictions caused by background information (i.e., non-temporal information). The present disclosure may enable improvements in performance and/or reliability of the computer vision task.

Further, because the neural network 210 may process only a differential image rather than a frame, the amount of information that is processed by the neural network 210 and that is remembered in a memory state of the neural network 210 may be reduced per unit frame. This means that the number of frames or the length of history for which the neural network 210 holds information in memory states may be increased without necessarily increasing the use of computer resources. Thus, a longer history of frames may be stored in the memory states of the neural network 210, which may enable improved accuracy and/or precision in predicted outputs (e.g., in the case of video captioning or visual question answering, a longer number of frames may be kept in the memory states of the neural network 210, to enable generation of a predicted output with a better understanding of the video).

In some examples, the neural network 210 may be implemented in a computing system separate from the system that captured the sequence of frames (e.g., a video may be captured on a consumer device and uploaded to an external cloud-based computing platform that executes the neural network 210). In such examples, instead of communicating the sequence of frames to the external system, only differential images may need to be communicated. This may help to preserve user privacy since the differential images contain only temporal information, which may be less sensitive than the information contained in the actual frames.

It should be noted that the examples disclosed herein may be used for processing a sequence of frames online (e.g., in real-time or near real-time as the frames are captured) or offline (e.g., the sequence of frames has been previously captured and stored). In some examples, the neural network 210 may be configured to process more than one differential image. For example, there may be two differential images inputted to the neural network 210 to generate the predicted output, where a first differential image is computed between a first frame at a first timestep t and a second frame at a second timestep t-$\Delta t_1$, and a second differential image is computed between the first frame and a third frame at a third timestep t-$\Delta t_2$, where $\Delta t_1$ and $\Delta t_1$ are different nonzero integers. Other such variations are within the scope of the present disclosure.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
obtaining a current frame corresponding to a current timestep in a sequence of frames, and a previous frame corresponding to a previous timestep in the sequence of frames that is previous to the current timestep, wherein the previous frame contains a tracked object that has been previously tracked in the previous frame and wherein the tracked object is present in the current frame and a current bounding box for the tracked object is absent in the current frame;
obtaining a stored bounding box for the tracked object in the previous frame;
defining a region of interest (ROI) in the previous frame, the ROI being defined based on the stored bounding box;
cropping the current frame and the previous frame to the defined ROI;
computing a differential image between the cropped current frame and the cropped previous frame; and
using the differential image to predict the current bounding box for the tracked object in the current frame by forward propagating the differential image through a neural network that is trained to perform an object tracking task by using the differential image as input to generate a predicted output including the current bounding box for the tracked object in the current frame.

2. The method of claim 1,
wherein the ROI is defined to be centered on the stored bounding box and is defined to have at least one dimension larger than a corresponding at least one dimension of the stored bounding box.

3. The method of claim 1, further comprising:
performing a signal check on the differential image to determine whether a signal representing an amount of useful information carried in the differential image passes a noise threshold; and
forward propagating the differential image though the neural network responsive to passing the noise threshold.

4. The method of claim 3, wherein the noise threshold is a static predefined noise threshold.

5. The method of claim 3, wherein the noise threshold is a dynamic spatiotemporal noise threshold.

6. The method of claim 3, wherein the signal is computed using a subset of pixels sampled from the differential image.

7. The method of claim 1, further comprising:
performing image alignment between the current frame and the previous frame, wherein the differential image is computed between the cropped current frame and the cropped previous frame after performing the image alignment; and
performing low-pass filtering on the differential image, wherein the low-pass filtered differential image is forward propagated through the neural network.

8. The method of claim 1, further comprising:
storing the current frame to be used as the previous frame in a next iteration of the obtaining, computing and generating.

9. A computing system comprising:
a processing unit configured to execute instructions to cause the computing system to:
obtain a current frame corresponding to a current timestep in a sequence of frames, and a previous frame corresponding to a previous timestep in the sequence of frames that is previous to the current timestep, wherein the previous frame contains a tracked object that has been previously tracked in the previous frame and wherein the tracked object is present in the current frame and a current bounding box for the tracked object is absent in the current frame;
obtain a stored bounding box for the tracked object in the previous frame;
define a region of interest (ROI) in the previous frame, the ROI being defined based on the stored bounding box;
crop the current frame and the previous frame to the defined ROI;
compute a differential image between the cropped current frame and the cropped previous frame; and
using the differential image to predict the current bounding box for the tracked object in the current frame by forward propagating the differential image through a neural network that is trained to perform an object tracking task by using the differential image as input to generate a predicted output including the current bounding box for the tracked object in the current frame.

10. The computing system of claim 9, wherein
the ROI is defined to be centered on the stored bounding box and is defined to have at least one dimension larger than a corresponding at least one dimension of the stored bounding box.

11. The computing system of claim 9, wherein the processing unit is configured to execute instructions to further cause the computing system to:
perform a signal check on the differential image to determine whether a signal representing an amount of useful information carried in the differential image passes a noise threshold; and
forward propagate the differential image though the neural network responsive to passing the noise threshold.

12. The computing system of claim 11, wherein the noise threshold is a static predefined noise threshold.

13. The computing system of claim 11, wherein the noise threshold is a dynamic spatiotemporal noise threshold.

14. The computing system of claim 11, wherein the signal is computed using a subset of pixels sampled from the differential image.

15. The computing system of claim 9, wherein the processing unit is configured to execute instructions to further cause the computing system to:
perform image alignment between the current frame and the previous frame, wherein the differential image is computed between the cropped current frame and the cropped previous frame after performing the image alignment; and
perform low-pass filtering on the differential image, wherein the low-pass filtered differential image is forward propagated through the neural network.

16. The computing system of claim 9, wherein the processing unit is configured to execute instructions to further cause the computing system to:
store the current frame to be used as the previous frame in a next iteration of the obtaining, computing and generating.

17. A non-transitory computer readable medium having instructions encoded thereon, wherein the instructions, when executed by a processing unit of a computing system, cause the computing system to:
obtain a current frame corresponding to a current timestep in a sequence of frames, and a previous frame corresponding to a previous timestep in the sequence of frames that is previous to the current timestep, wherein the previous frame contains a tracked object that has been previously tracked in the previous frame and wherein the tracked object is present in the current frame and a current bounding box for the tracked object is absent in the current frame;
obtain a stored bounding box for the tracked object in the previous frame;
define a region of interest (ROI) in the previous frame, the ROI being defined based on the stored bounding box;
crop the current frame and the previous frame to the defined ROI;
compute a differential image between the cropped current frame and the cropped previous frame; and
using the differential image to predict the current bounding box for the tracked object in the current frame by forward propagating the differential image through a neural network that is trained to perform an object tracking task by using the differential image as input to generate a predicted output including the current bounding box for the tracked object in the current frame.

18. The non-transitory computer readable medium of claim 17, wherein
the ROI is defined to be centered on the stored bounding box and is defined to have at least one dimension larger than a corresponding at least one dimension of the stored bounding box.

19. The non-transitory computer readable medium of claim 17, wherein the instructions further cause the computing system to:
perform a signal check on the differential image to determine whether a signal representing an amount of useful information carried in the differential image passes a noise threshold; and
forward propagate the differential image though the neural network responsive to passing the noise threshold.

20. The non-transitory computer readable medium of claim 17, wherein the instructions further cause the computing system to:
perform image alignment between the current frame and the previous frame, wherein the differential image is computed between the cropped current frame and the cropped previous frame after performing the image alignment; and perform low-pass filtering on the differential image, wherein the low-pass filtered differential image is forward propagated through the neural network.

* * * * *